Aug. 22, 1950     E. NEWBURY     2,519,922
EDUCATIONAL AND DISPLAY DEVICE
Filed Sept. 25, 1945     4 Sheets-Sheet 1
Inventor
EDWARD NEWBURY,
By Clarence A. O'Brien
and Harvey B. Jackson
Attorneys Aug. 22, 1950        E. NEWBURY        2,519,922
EDUCATIONAL AND DISPLAY DEVICE
Filed Sept. 25, 1945        4 Sheets-Sheet 2
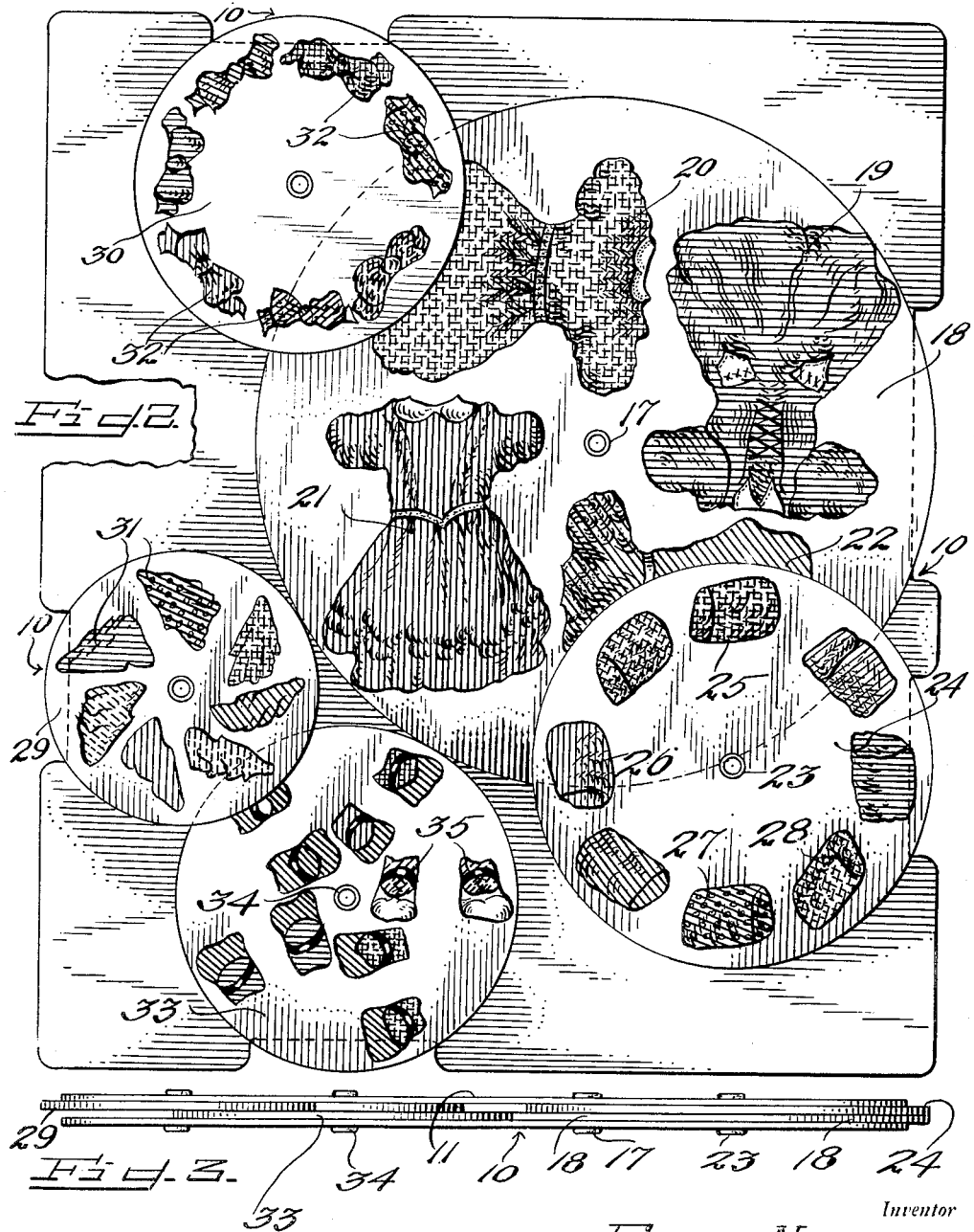
Inventor
EDWARD NEWBURY,
By *Clarence A. O'Brien
and Harvey B. Jackson*
Attorneys Aug. 22, 1950 E. NEWBURY 2,519,922
EDUCATIONAL AND DISPLAY DEVICE
Filed Sept. 25, 1945 4 Sheets-Sheet 3
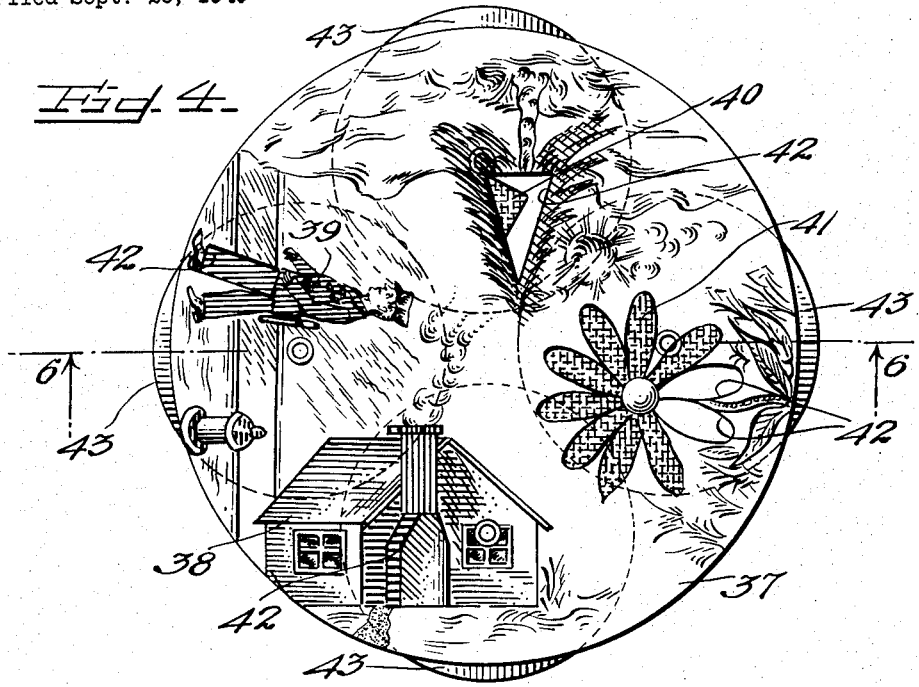
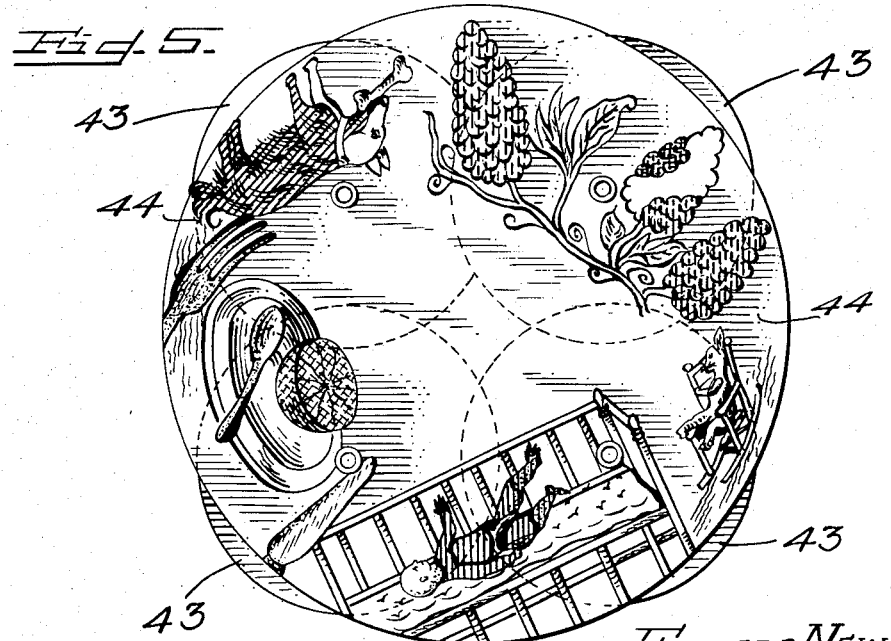
Inventor
EDWARD NEWBURY,
By Clarence A. O'Brien
and Harvey B. Jacobson
Attorneys Aug. 22, 1950 — E. NEWBURY — 2,519,922
EDUCATIONAL AND DISPLAY DEVICE
Filed Sept. 25, 1945 — 4 Sheets-Sheet 4
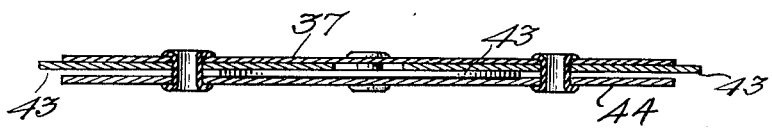
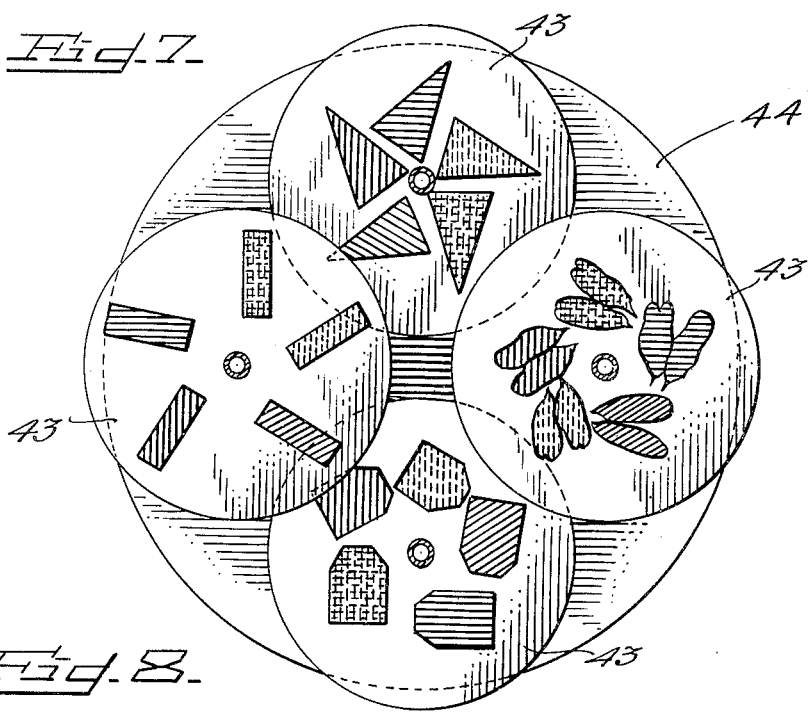
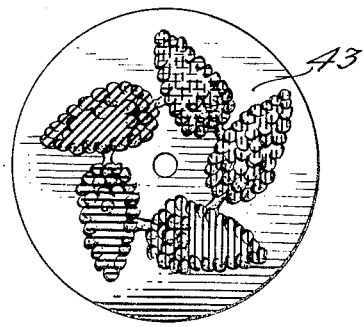
Inventor
EDWARD NEWBURY,
By Clarence A. O'Brien
and Harvey B. Jackson
Attorneys Patented Aug. 22, 1950

2,519,922

UNITED STATES PATENT OFFICE 2,519,922

EDUCATIONAL AND DISPLAY DEVICE

Edward Newbury, Lexington, Ky.

Application September 25, 1945, Serial No. 618,475

4 Claims. (Cl. 35—56)

This invention relates to an educational and display device and has for its primary object to combine in a single unit an item which will serve not only as a source of amusement to a child, but also will serve to teach colors and the combinations of colors to the user.

Another object is to train an individual properly to match components of a pictorial representation to produce a pleasing ensemble, or an accurate pictorial representation of an object or to test his ability to do either.

Among its features, my invention embodies a fixed panel carrying, on its face, a pictorial representation, at least one component of which is cut out or omitted so as to form a window in the panel of the size and shape of the component, at least one movable panel associated with the fixed panel and visible through the window, the movable panel carrying a series of pictorial representations of the omitted component of the pictorial representation carried on the fixed panel, at least one of which series of components carries indicia which, when the said component is properly matched behind the window, completes the ensemble to produce an arcuate pictorial representation in combination with the representation carried on the fixed panel.

In the drawings:

Figure 1 is a front view of the device showing a pictorial representation of a doll and illustrating in dotted lines the movable panels associated therewith, Figure 2 is a vertical sectional view through Figure 1 showing the movable panels bearing the series of components of the pictorial representation carried on the panel shown in Figure 1, Figure 3 is an edge view of Figure 2, Figure 4 is a front view of a modified form of the device showing the upper face thereof, Figure 5 is a view of the reverse face of Figure 4, Figure 6 is a sectional view taken substantially on the line 6—6 of Figure 4, Figure 7 is a sectional view through Figure 4 showing the movable panels with their respective series of components employed to complete the pictorial representations on the panel shown in Figure 4, and Figure 8 is a face view of the reverse side of one of the movable panels illustrated in Figure 7.

Referring to the drawings in detail, this improved educational and display device, designated generally 10, comprises a front panel 11 carrying, on its outer face, a pictorial representation 12, which, in the present instance, takes the form of a doll, though it is to be understood that any other objects having a multiplicity of component parts may be depicted. In the form of the device illustrated in Figure 1, the dress of the doll is defined by an outline 13 which is punched out to form a window, the purpose of which will be more fully hereinafter described. A similar window 14 is formed in the panel 11 of a size and shape to represent a hand-bag in the hands of the doll 12. Likewise a window 15 shaped to represent a draped handkerchief is formed in the panel 11 to simulate a handkerchief dangling from the finger tips of the hand of the doll opposite that carrying the hand-bag. Still another window 16 shaped to conform to the size and shape of a hair bow is cut out of the panel 11 in the proper position with relation to the doll 12. It is obvious that other pictorial representations may be employed wherein the component parts or at least certain component parts may be cut out to form windows through which the component parts carried by the movable panels, to be more fully hereinafter described, may be viewed.

Pivotally supported at 17 at the rear of the panel 11 is a movable panel 18 carrying, on its face which faces the back of the panel 11, a series of pictorial representations of items 19, 20, 21, and 22, which are outlined to conform in size and shape with the window 13. In the present instance, the dress 19 will be blue, the dress 20 yellow, and the dress 21 red, while the dress 22 will be green. It will thus be seen that the doll 12 depicted on the panel 11 may be provided with a change of costume by simply rotating the disk 18 about its pivot 17. Due to the fact that the dresses 19, 20, 21, and 22 are definitely outlined, it will be obvious that any misalignment of the parts when adjusting them to change the costume of the doll 12 will be readily detectable by either the child using the device or a grown-up under whose instructions the child may be playing so that the child may be taught to bring the dress into proper alignment with the window 13. It is obvious that in instructing the child in using the device, it is important to stress the proper alignment of the chosen dress with the window 13.

Rotatably mounted, as at 23 behind the panel 11, is a movable panel 24 upon which is depicted a series of components of the picture on the front of the panel 11 which conform in size and shape to the window 14 representing the hand-bag. The representation 25 will, for instance, be blue, while the representation 26 is shown as red, the representation 27 will be green, while the representation 28 will be yellow. By rotating the disk 24 about its pivot 23, it is obvious that the hand-bag representations carried on the face thereof will become visible through the window 14 and inasmuch as the hand-bags are outlined, it is essential for the complete picture to have the outlines of the hand-bags on the disk 24 in accurate registration with the edges of the window 14. Inasmuch as certain of the hand-bag representations are of matching or harmonizing colors with the representations of the dresses on the disk 18, it is obvious that a child may be taught to produce pleasing and harmonious combinations of colors by bringing the hand-bags in position before the window 14 which will match the color of the dress viewed through the window 13. The other hand-bags depicted on the disk 24 may be of contrasting combinations of colors, some of which may be made to harmonize with the dresses depicted on the disk 18 while still others may be representations which are completely out of harmony therewith.

In order that the various components of the pictorial representation of the doll may be made to harmonize through the windows 15 and 16, disks or panels 29 and 30 carrying, respectively, pictorial representations 31 and 32 of handkerchiefs and hair bows may be employed, it being understood that the colors of these representations are also arranged for harmonious cooperation with the whole and are also designed to produce undesirable contrasts. A disk or panel 33 may also be pivoted as at 34 to rotate in the rear of the panel 11 and carries on its face adjacent the rear face of the panel 11 pictorial representations 35 which are adapted to be viewed through windows 36 so that the socks and shoes of the pictorial representation 12 of the doll may be also made to harmonize with the general ensemble, it being understood that the representations 35 are also produced in harmonizing as well as contrasting colors.

In the modifications illustrated in Figures 4 through 8, inclusive, a front panel 37 is provided with a plurality of pictorial representations 38, 39, 40 and 41, and one component of each is cut out to form windows 42. Rotatably mounted behind the panel 37 are panels 43, each of which carries a series of pictorial representations of the components defined by the windows 42. The pictorial representations are of various different colors, at least one of which is of a color proper to match with its respective pictorial representation on the panel 37 so that when the proper pictorial representation on the panel 43 is moved into registration with its respective window 42, the pictorial representation on the panel 37 will have been completed. The other side of each disk 43 likewise is provided with pictorial representations of components of a picture or pictorial representation carried on the outer face of a back panel 44 so that a large number of combinations may be carried by a single toy. It will be noted that the front panel 37 carries the major colors, that is, red, yellow, blue, and green, while the back panel 44 is confined to the minor colors, pink, orange, brown, and purple. It is to be understood that any groups of colors or combinations or shades of colors may be employed to bring about the proper recognition of colors and shades thereof in the child engaged in play with the device.

It is obvious from the foregoing that a child engaged in manipulating these toys will be taught not only to align the proper pictorial representation of the components in the picture proper, but also will be taught to bring about harmonious color combinations, thus contributing generally to his fund of knowledge.

It is also obvious that the device depicted in Figures 1 through 3, inclusive, may be employed as a display device by which a dress and its harmonious accessories may be shown for advertising and like purposes and either device can be used to test an individual's ability to effect harmonious combinations in colors or patterns, to match like colors and distinguish unlike ones, or to match and distinguish patterns.

While in the foregoing, there has been shown and described the preferred embodiment of this invention, it is to be understood that minor changes in the details of construction and combination and arrangement of parts may be resorted to without departing from the spirit and scope of the invention as claimed.

Having thus described the invention, what I claim is:

1. An educational device which includes a panel having on its face a pictorial representation of an object, a plurality of windows in the panel, each window conforming in size and shape to a distinct component of the pictorial representation, a panel associated with each window and independently movable with relation to the first-mentioned panel, each movable panel carrying a series of pictorial representations of the component defined by its respective window, and being so colored that a harmonizing ensemble may be produced.

2. An educational device which includes a panel having on its face a pictorial representation of an object, a plurality of windows in the panel, each window conforming in size and shape to a distinct component of the pictorial representation, a panel associated with each window and independently movable with relation to the first-mentioned panel, each movable panel carrying a series of pictorial representations of the component defined by its respective window, and at least one of each series of pictorial representations carrying indicia common to at least one indicia carried by another of said series.

3. An educational device which includes a panel having on its face a pictorial representation of an object, a plurality of windows in the panel, each window conforming in size and shape to a distinct component of the pictorial representation, a panel mounted to rotate behind each window, each rotatable panel having an annular series of radially spaced pictorial representations of the component defined by its respective window and at least one of each series of pictorial representations carrying indicia common to at least one indicia carried by another of said series.

4. An educational device which includes a panel having on its face a pictorial representation of an object, a plurality of windows in the panel, each window conforming in size and shape to a distinct component of the pictorial representation, a panel mounted to rotate behind each window, each rotatable panel having an annular series of radially spaced pictorial representations of the component defined by its respective window and at least one of each series of pictorial representations carrying a color common to at least a color carried by another of said series.

EDWARD NEWBURY.

(References on following page)

REFERENCES CITED

The following references are of record in the file of this patent:

UNITED STATES PATENTS

| Number | Name | Date |
|---|---|---|
| 280,318 | Marquart | June 26, 1883 |
| 446,468 | Reed | Feb. 17, 1891 |
| 1,177,652 | Robertson | Apr. 4, 1916 |
| 1,243,957 | McCluer | Oct. 23, 1917 |
| 1,549,673 | Levva | Aug. 11, 1925 |
| 1,738,398 | Sesti | Dec. 3, 1929 |
| 1,832,750 | Stephens | Nov. 17, 1931 |
| 2,071,338 | Henze | Feb. 23, 1937 |
| 2,234,609 | Rowe | Mar. 11, 1941 |
| 2,294,131 | Raymond | Aug. 25, 1942 |

FOREIGN PATENTS

| Number | Country | Date |
|---|---|---|
| 115,382 | Australia | July 2, 1942 |